United States Patent [19]

Hardiman et al.

[11] Patent Number: 5,100,547
[45] Date of Patent: Mar. 31, 1992

[54] CHROMATOGRAPHY SUPPORTS CONSISTING OF AN INORGANIC SUSBSTRATE COATED WITH POLYBUTADIENE WITH ALKYL SIDE CHAINS

[75] Inventors: Christopher J. Hardiman, University City; Jawed Asrar, Chesterfield, both of Mo.

[73] Assignee: Monsanto Company, St. Louis, Mo.

[21] Appl. No.: 664,167

[22] Filed: Mar. 4, 1991

[51] Int. Cl.⁵ .............................................. B01D 15/08
[52] U.S. Cl. .............................. 210/198.2; 210/502.1; 210/635; 210/656; 427/220
[58] Field of Search ...................... 210/198.2, 656, 635, 210/502.1; 427/221, 220; 525/74

[56] References Cited

U.S. PATENT DOCUMENTS

| | | | |
|---|---|---|---|
| 4,045,353 | 8/1977 | Kosaka et al. | 210/502 |
| 4,245,005 | 1/1981 | Regnier et al. | 428/420 |
| 4,913,935 | 4/1990 | Lin | 427/221 |

OTHER PUBLICATIONS

Schomburg, LC-GC 6(1) pp. 36-50 (1988), Stationary Phases in High Performance Liquid Chromatography.
Schomburg et al., Chromatographia 18 (5) pp. 265-274 (1984).
Bien-Vogelang et al., Chromatographia 19, pp. 170-179 (1984).
Figge et al., J. Chromatography, 351, pp. 393-408 (1986).
Kolla et al., Chromatographia 23 (7), pp. 465-472 (1987).
Haky et al., J. Chromatography, 505, pp. 307-318 (1990).
Unisphere-PBD Alumina, a Product Bulletin of Biotage, Inc.
Schnecko et al., Angewandte Makromolekulare Chemie 20 (278), pp. 111-119 (1971).
Berezkin et al., Zh. Fiz. Khim., 1966, 40 (1921).

Primary Examiner—Robert A. Dawson
Assistant Examiner—Sun Uk Kim
Attorney, Agent, or Firm—Thomas E. Kelley; Richard H. Shear

[57] ABSTRACT

Stationary phases, useful for reversed-phase liquid chromatography, comprise polybutadiene-coated inorganic substrates having enhanced hydrophobicity due to attached alkyl groups, e.g. 2-30 carbon alkyl groups such as an octadecene group, and a low level of carbon-oxygen bonding in the polymer coating, e.g. less than 1 percent of the carbon in the polymer coating is bonded to oxygen.

10 Claims, No Drawings

CHROMATOGRAPHY SUPPORTS CONSISTING OF AN INORGANIC SUSBSTRATE COATED WITH POLYBUTADIENE WITH ALKYL SIDE CHAINS

Disclosed herein are inorganic substrates coated with polybutadiene having alkyl groups attached thereto and methods of making such coated inorganic substrates, which are especially useful as stationary phases for reversed-phase liquid chromatography.

BACKGROUND OF THE INVENTION

In chromatographic separation technology, resolution of components in a chromatographic column is achieved by partitioning solutes between a mobile phase, e.g. a solvent, and a stationary phase. Partitioning is effected by choice of solvent, solvent flow rate, concentration of solutes and the nature of the stationary phase. Common stationary phases for reversed-phase liquid chromatography of proteins and peptides comprise substrates coated with solute interacting polymers or grafted monomers. More particularly, such stationary phases include a variety of silica and/or alumina materials with surfaces modified, e.g. with an alkyl silane, or coated with a polymer, e.g. an alkyl polysiloxane or polybutadiene. The preparation and use of such stationary phases in high performance liquid chromatography are disclosed by Schomburg in LC-GC 6(1) p. 36–50 (1988); Schomburg et al. in Chromatographia 18 (5) p. 265–74 (1984); Bien-Vogelang et al. in Chromatographia 19 p. 170–9 (1984); Figge et al. in Journal of Chromatography, 351 p.393–408 (1986); and Kolla et al. in Chromatographia 23(7) p.465–72 (1987). When such silica and/or alumina particles modified by silanization, e.g. with an 18 carbon alkyl terminated silane, or an alkyl polysiloxane coating are used in separating proteins and peptides, residual peptide is washed from stationary phases using alkaline solutions which adversely effect the inorganic substrate, e.g. the substrate can be dissolved by such alkaline solutions.

Polybutadiene coated substrates have provided stationary phases for liquid chromatography that are used more successfully in peptide applications. That is, residual peptides can be washed from such polybutadiene coated substrates without the adverse effects of high pH alkaline solutions.

Another aspect of improvement to liquid chromatography results from alumina substrates of enhanced surface area as manifested by Unisphere ® alumina particles developed by Alcoa and consisting of microporous platelets bonded together to form macroporous spherules. See Haky et al., Journal of Chromatography, 505, p. 307–318 (1990), for a disclosure of coating such alumina particles with phosphate bonded octadecyl monomer. Product bulletins from Biotage Inc., Charlottesville, Va., disclose a commercially available stationary phase for liquid chromatography comprising Unisphere alumina particles coated with polybutadiene having resistance to high pH exposure; such stationary phases, however, are not sufficiently hydrophobic for some enhanced peptide separations.

An object of this invention is to provide stationary phases having a high degree of resistance to alkaline environments and increased hydrophobicity commensurate with providing higher resolution of chromatograms of peptides.

SUMMARY OF THE INVENTION

This invention provides novel stationary phases for reversed-phase liquid chromatography consisting of inorganic substrate occludingly-coated with a crosslinked polymer so that the integrity of the stationary phase is not adversely affected by extended exposure to liquid environments having a pH of 12. In the stationary phases of this invention the polymer coating consists of polybutadiene having attached thereto at least 1 alkyl side chain per 20 olefin monomer units of said polymer coating. Such alkyl side chains can comprise from 2 to about 30 carbon atom, preferably predominately an 18 carbon atom alkyl side chain. When compared with prior art stationary phases, e.g. comprising alumina coated with polybutadiene having about 18 mole percent vinyl groups per butadiene unit, the stationary phases of this invention exhibit increased hydrophobicity so that the retention time of o-xylene, a hydrophobic species, is increased by at least 15%, e.g. by at least about 30%. An increase in retention time for hydrophobic species such as o-xylene, is provided by ensuring that there is less than 1 percent of carbon-oxygen bonding in the polybutadiene coating.

Another aspect of this invention provides methods for preparing stationary phases for liquid chromatography comprising a polymeric coating on an inorganic oxide substrate. The low level of carbon-oxygen bonding in the polybutadiene is provided by removing adsorbed oxygen from the substrate prior to crosslinking and grafting or by using a sufficiently high level of free radical initiator to serve as an oxygen scavenger.

Still another aspect of this invention provides methods for high performance liquid chromatography, e.g. for separating proteins or peptides, using the novel stationary phases of this invention.

DETAILED DESCRIPTION OF PREFERRED EMBODIMENTS

As used in the following description and claims of the stationary phases of this invention, the term "retention time" describes the elution time of a solute, e.g. o-xylene, in a liquid chromatography column (i.e. stainless steel column 4.6 mm I.D.×250 mm long) packed with 3.5 g of stationary phase subjected to mobile phase (45% Water-55% acetonitrile) flowing at 0.5 mL/min. The baseline measure of hydrophobicity of the prior art stationary phase comprising Unisphere ® alumina spherules coated with polybutadiene having about 18 vinyl units per olefin unit of the polybutadiene coating was determined to be a retention time of 9.5–10.5 minutes for o-xylene in a mixture of solutes. A useful solute mixture for characterizing chromatrographic separation performance includes, in order of increasing hydrophobicity: theophylline, p-nitroanaline, methyl benzoate, phenetole and o-xylene (at 1 mg/ml of each solute in a 50:50 water/acetonitrile solution).

The improvement of hydrophobicity for the stationary phases of this invention is characterized as an increase in retention time for o-xylene by at least 15%. That is, the stationary phase is coated with polybutadiene having sufficient alkyl group side chains, as compared to prior art coatings comprising polybutadiene having only vinyl units, so that the retention time of a hydrophobic solute, i.e. o-xylene, is increased by at least 15%. In a preferred aspect of this invention the stationary phase will exhibit a retention time for o-xylene of at least 20% or more, say at least about 30%.

The stationary phases of this invention exhibit increases hydrophobicity due to the addition of alkyl groups and a low level of carbon-oxygen bonding in the polybutadiene coating. It has been discovered that, where there is no regard to oxygen adsorbed on the inorganic substrate, the effort of attaching alkyl groups to a polybutadiene coating can provide unsuitable stationary phases. For instance, it is believed that adsorbed oxygen can desorb under crosslinking and/or graftlinking conditions and be available for bonding to carbon in the polybutadiene creating carbon-oxygen bonding which is sufficiently hydrophilic to counteract hydrophobic effects of alkyl grafting to the polybutadiene. The beneficial increase in hydrophobicity from attached alkyl groups can be maintained when carbon-oxygen bonding is maintained at a low level. i.e. less than 1 percent of the bonding in the polybutadiene. Such low level of carbon-oxygen bonding can be achieved by removing adsorbed oxygen from the inorganic substrate prior to coating with polymer or by scavenging any oxygen that might be desorbed. Oxygen scavenging can be achieved by using grafting techniques that utilize a free radical initiator that interacts with reactable oxygen. For instance, the use of excess free radical initiator, e.g. peroxides such as peroxides benzoyl peroxide or dicumyl peroxide, boron trifluoride etherate, n-butyl lithium, titanium tetrachloride, and the like, can effectively scavenge oxygen to preclude carbon-oxygen bonding.

The stationary phases for reversed-phase liquid chromatography according to this invention consist of inorganic substrates coated with polybutadiene having attached thereto at least 1 alkyl side chain per 20 olefin monomer units of the polybutadiene polymer coating. In a preferred aspect of this invention the polybutadiene will have attached thereto at least 1 alkyl side chain per 10 olefin monomer units of the polybutadiene coating. The alkyl group side chains can comprise from 2 to about 30 carbon atoms; in a preferred embodiment substantially all of the alkyl groups will have about 18 carbon atoms.

Inorganic substrates can be microporous alumina, zirconia, titania or silica. Due to the high amount of surface area and higher alkaline resistance, a preferred substrate is Alcoa's Unisphere alumina particles which comprise a plurality of microporous alumina platelets bonded together to form a macroporous, substantially spherical particle having a nominal diameter of 8 micrometers. Such Unisphere particles have micropores of a diameter predominately in the range of 50 to 1000 Angstroms.

Polybutadiene, as used herein, can include homopolymers of butadiene and copolymers, e.g. styrene-butadiene or acrylonitrile-butadiene copolymers. The polybutadiene coating is so occluding on the substrate that the integrity of the stationary phase is not adversely affected by extended exposure to liquid environments having a pH of 12, preferably 13. When the substrate has micropores in the range of 50 to 1000 Angstroms, the polybutadiene coating should be applied as an oligomer having a sufficiently low molecular weight, e.g. less than 50,000 Daltons, so as to penetrate the pores of the substrate and not block pores thereby reducing effective surface area of the substrate. Preferably the oligomer will have a molecular weight of less than about 25,000 Daltons; more preferably, the oligomer will have a molecular weight of less than 10,000 Daltons, say about 5,000 Daltons.

The stationary phases of this invention are useful for reversed-phase liquid chromatography, e.g. as illustrated in the following examples.

EXAMPLE 1

This example illustrates the preparation of stationary phases according to this invention where hydrophilic vinyl groups of polybutadiene coating on a substrate are converted to hydrophobic ethyl groups without adding carbon-oxygen bonding. Polybutadiene oligomer (99% unsaturation; 25% 1-2; 40% trans 1,4-; and 35% cis 1,4-) was partially hydrogenated by reacting molar equivalent quantities of the polybutadiene oligomer with 0.9 mole equivalent of p-toluene sulfonhydrazide in boiling toluene. The partially hydrogenated polybutadiene was coated onto Unisphere alumina particles by mixing 1 part of alumina with 0.1 part of partially hydrogenated polybutadiene and 0.005 part of dicumyl peroxide in a toluene medium providing a crosslinked polybutadiene coating with essentially no vinyl groups, i.e. the polybutadiene had attached thereto ethyl groups at a level of about 20 mole percent per butadiene monomer unit. The toluene was removed by evaporation and the oligomer crosslinked by heating to 160° C. in the absence of air. The polymer-coated alumina was packed into a liquid chromatography column and evaluated with a mixture of solutes including o-xylene as the most hydrophobic component. When compared to a commercial stationary phase, i.e. polybutadiene-coated Unisphere alumina particles having about 18 mole percent vinyl groups per butadiene unit, the partially hydrogenated polybutadiene-coated stationary phase of this Example exhibited increased hydrophobicity, as manifested by about a 50% increase in retention time for o-xylene, and improved selectivity for separating the solute mixture.

EXAMPLE 2

This example illustrates the preparation of stationary phases according to this invention where polybutadiene oligomer and an alpha olefin are coated onto Unisphere alumina particles followed by simultaneous crosslinking and graftlinking of the alpha olefin to the polybutadiene. One part by weight of Unisphere alumina particles was mixed with 0.1 parts of the polybutadiene oligomer (99% unsaturation; 25% 1,2 and 75% 1,4; molecular weight: 3400 Daltons), 0.2 part 1-octadecene and 0.01 part of dicumyl peroxide in a toluene medium. The toluene was removed by evaporation. Simultaneous polymer crosslinking and octadecene grafting was effected by heating the coated particles to 130° C. in the absence of air. The coated particles were then washed with mixtures of (1) acetic acid/hexane and (2) sodium hydroxide/water/methanol and then thoroughly dried. Elemental analysis indicated the presence of at least about 1 grafted octadecyl groups per 20 butadiene monomer units. When compared to a commercial stationary phase, i.e. polybutadiene-coated Unisphere alumina particles having about 18 mole percent vinyl groups per butadiene unit, the alkyl-grafted, polybutadiene-coated stationary phase of this Example exhibited increased hydrophobicity, as manifested by about a 30% increase in retention time for o-xylene, and improved selectivity for separating the solute mixture.

EXAMPLE 3

This example illustrates the preparation of stationary phases according to this invention where an alpha olefin is grafted onto polybutadiene coated Unisphere ® alumina particles. One part by weight of polybutadiene-coated Unisphere ® alumina particles having about 18 mole percent vinyl groups per butadiene unit was mixed with 0.3 parts of octadecene and 0.021 parts of a UV-sensitive free radical initiator (Darocur 1664 from Merck) in hexane. After the solvent was removed by evaporation, the dried particles were exposed under a nitrogen environment to ultraviolet radiation, washed with a mixture of acetic acid and hexane, followed by a hexane wash and then dried in an oven at 100° C. The polymer-coated particles exhibited about a 15 percent increase in polymer weight due to grafted octadecyl groups. When compared to a commercial stationary phase, i.e. polybutadiene-coated Unisphere alumina particles having about 18 mole percent vinyl groups per butadiene unit, the alkyl-grafted, polybutadiene-coated stationary phase of this Example exhibits increased hydrophobicity, as manifested by an increase in retention time for o-xylene, and improved selectivity for separating the solute mixture.

EXAMPLE 4

This example illustrates the preparation of stationary phases according to this invention where an alpha olefin is grafted onto polybutadiene-coated Unisphere ® alumina particles.

The procedure of Example 3 was followed except that the free radical initiator was replaced by 0.0176 parts benzoyl peroxide. After evaporation of the hexane, the particles were heated to 150° C., overnight (e.g. about 16 hours), then washed. The polymer-coated particles exhibited about a 30 percent increase in polymer weight due to grafted octadecyl groups. The alkyl-grafted, polybutadiene-coated stationary phase exhibits increased hydrophobicity and improved selectivity for separating the solute mixture.

While specific embodiments have been described herein it should be apparent to those skilled in the art that various modifications thereof can be made without departing from the true spirit and scope of the invention. Accordingly, it is intended that the following claims cover all such modifications within the full inventive concept.

What is claimed is:

1. A stationary phase for chromatography consisting of an inorganic substrate occludingly-coated with a crosslinked polymer consisting of polybutadiene having attached thereto at least 1 alkyl side chain per 20 olefin monomer units of said polymer and wherein less than 1 percent of the carbon in the polybutadiene is bonded to oxygen.

2. A stationary phase according to claim 1 wherein the substrate is so occludingly coated with said polybutadiene that the integrity of the stationary phase is not adversely affected by extended exposure to liquid environments having a pH of 12.

3. A stationary phase according to claim 1 wherein said substrate is alumina or silica.

4. A stationary phase according to claim 3 wherein said substrate has micropores of a diameter predominately in the range of 50 to 1000 Angstroms.

5. A stationary phase according to claim 4 wherein said substrate comprises a plurality of microporous alumina platelets bonded together to form a macroporous, substantially spherical particle having a nominal diameter of 8 micrometers.

6. A stationary phase according to claim 1 wherein said alkyl side chains comprise from 2 to about 30 carbon atoms.

7. A stationary phase according to claim 6 comprising at least 1 alkyl side per 20 olefin monomer units of said polymer.

8. A stationary phase according to claim 1 wherein substantially all of said alkyl side chains have about 18 carbon atoms.

9. A stationary phase according to claim 1 wherein the stationary phase exhibits hydrophobicity such that the retention time of o-xylene is increased by at least 15% over retention time for a stationary phase coated with polybutadiene having about 18 mole percent vinyl groups per butadiene unit.

10. A stationary phase according to claim 9 wherein said retention time is increased by at least 30%.

* * * * *